(12) United States Patent
Swanson et al.

(10) Patent No.: US 8,539,245 B2
(45) Date of Patent: Sep. 17, 2013

(54) APPARATUS AND METHOD FOR ACCESSING A SECURE PARTITION IN NON-VOLATILE STORAGE BY A HOST SYSTEM ENABLED AFTER THE SYSTEM EXITS A FIRST INSTANCE OF A SECURE MODE

(75) Inventors: Robert C. Swanson, Olympia, WA (US); Mallik Bulusu, Olympia, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 382 days.

(21) Appl. No.: 12/852,303

(22) Filed: Aug. 6, 2010

(65) Prior Publication Data

US 2012/0036347 A1 Feb. 9, 2012

(51) Int. Cl.
*G06F 21/00* (2013.01)
*G06F 15/177* (2006.01)
*G06F 9/00* (2006.01)

(52) U.S. Cl.
USPC ............................... 713/182; 713/1; 713/100

(58) Field of Classification Search
USPC .............................................. 713/1, 100, 182
See application file for complete search history.

(56) References Cited

U.S. PATENT DOCUMENTS

| | | | |
|---|---|---|---|
| 5,944,821 A * | 8/1999 | Angelo | 726/22 |
| 6,292,874 B1 | 9/2001 | Barnett | |
| 7,082,509 B2 | 7/2006 | Zimmer et al. | |
| 7,103,529 B2 | 9/2006 | Zimmer et al. | |
| 7,260,848 B2 | 8/2007 | Zimmer | |
| 7,689,817 B2 | 3/2010 | Zimmer et al. | |
| 2003/0041248 A1* | 2/2003 | Weber et al. | 713/182 |
| 2004/0148480 A1 | 7/2004 | Watt et al. | |
| 2006/0156008 A1 | 7/2006 | Frank | |
| 2008/0120499 A1 | 5/2008 | Zimmer et al. | |
| 2008/0147555 A1 | 6/2008 | Cromer et al. | |
| 2009/0063835 A1 | 3/2009 | Yao et al. | |
| 2009/0300370 A1 | 12/2009 | Yao et al. | |
| 2010/0077199 A1* | 3/2010 | Hobson et al. | 713/100 |
| 2011/0099348 A1* | 4/2011 | Buban et al. | 711/163 |

FOREIGN PATENT DOCUMENTS

KR 10-0710846 4/2007

OTHER PUBLICATIONS

Intel, "Intel® Platform Innovation Framework for EFI Architecture Specification," Sep. 16, 2003, pp. 1-119.
Patent Cooperation Treaty, Notification of Transmittal of the International Search Report and the Written Opinion of the International Searching Authority mailed Feb. 28, 2012 in International application No. PCT/US2011/046380.

* cited by examiner

*Primary Examiner* — Thomas Lee
*Assistant Examiner* — Terrell Johnson
(74) *Attorney, Agent, or Firm* — Trop, Pruner & Hu, P.C.

(57) ABSTRACT

In one embodiment, a peripheral controller coupled to a processor can include a storage controller. This storage controller can control access to a non-volatile storage coupled to the peripheral controller. The storage may include both secure and open partitions, and the storage controller can enable access to the secure partition only when the processor is in a secure mode. In turn, during unsecure operation such as third party code execution, visibility of the secure partition can be prevented. Other embodiments are described and claimed.

20 Claims, 8 Drawing Sheets

FIG. 8

APPARATUS AND METHOD FOR ACCESSING A SECURE PARTITION IN NON-VOLATILE STORAGE BY A HOST SYSTEM ENABLED AFTER THE SYSTEM EXITS A FIRST INSTANCE OF A SECURE MODE

BACKGROUND

Computer systems implement a mode referred to as system management mode (SMM) which is a part of system software, namely part of basic input/output system (BIOS). This SMM is executed from a small protected location in system memory, called system management mode random access memory (SMRAM). Some security attacks are based on access to the memory. Also, this memory region is space constrained.

In addition to this protected memory, other secure information is present in a system such as various passwords. The storage location of system passwords is contained in either complementary metal oxide semiconductor (CMOS) or host visible non-volatile memory so a host (e.g., processor or operating system (OS)) can read them. While the passwords themselves can be encrypted, a malicious user can still delete them. Once the passwords are deleted or null, an attacker can set their own passwords, which may lead to various attacks.

Top segment of memory (TSEG) is the portion of system memory (e.g., dynamic random access memory (DRAM)) carved out for BIOS SMM runtime and certain debug usage. Current chipsets may limit this space to 8 megabytes (MB) with 4 MB for BIOS feature space, but with future chipsets this can be much larger. However, all of the TSEG DRAM is stolen from the host below 4 gigabytes (GB). This is a precious resource on platforms and BIOS seeks to minimize its usage (this is especially scarce for 32-bit OS's and Peripheral Component Interconnect (PCI)-Express™ systems where latter memory-mapped I/O is stealing ever more of the resources below 4 GB). Additionally, because of security concerns BIOS may not call outside of SMRAM/TSEG. Thus TSEG RAM provides a limit for all SMM-based features. Additionally, there is no secure BIOS-only non-volatile RAM store because the BIOS flash device is readable by the OS/host. This too may lead to security concerns. For example, various configuration information is stored into unprotected DRAM during a low power state, which can enable a malicious user to access the unprotected data while the DRAM is in a self-refresh state.

DETAILED DESCRIPTION

Figure 1:
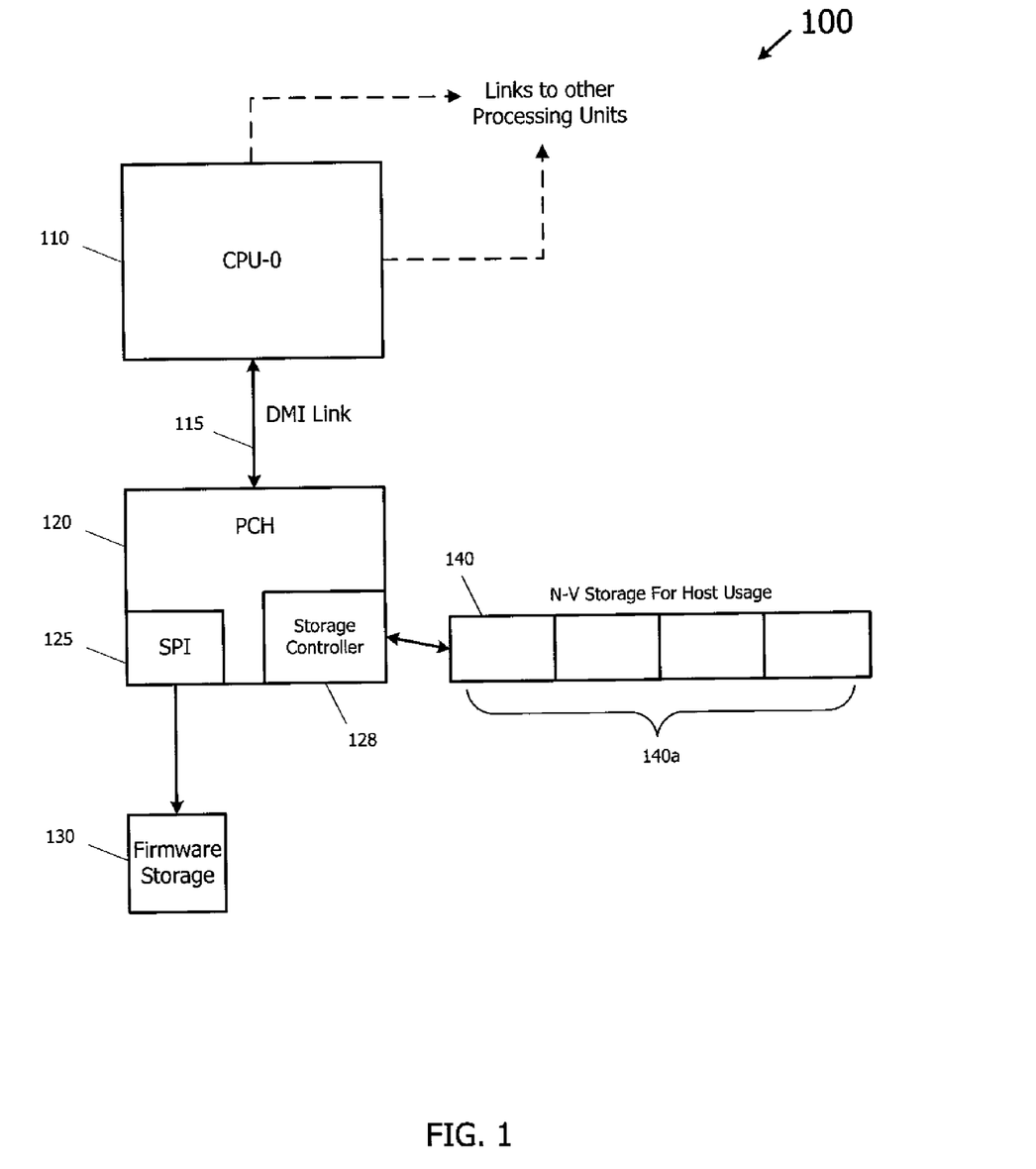
FIG. 1 is a block diagram of a portion of a system in accordance with one embodiment of the present invention.

Embodiments may utilize a portion of a fast non-volatile (NV) memory as a secure NV store for BIOS features and secure logging. In this way various firmware and other system software, system tables, passwords and so forth, can be stored during system operation (and may maintain state during a low power state of an associated processor). Referring now to FIG. 1, shown is a block diagram of a portion of a system in accordance with one embodiment of the present invention. As shown in FIG. 1, system 100 may be any type of computer system such as a server system, desktop system, laptop system, netbook, cellular phone, smartphone, mobile Internet device, or so forth. As seen, system 100 may include a central processing unit (CPU) 110 which may include one or more processing cores to execute instructions. As seen, in an implementation for a multiprocessor system such as a server, multiple links may be provided to link CPU 110, which may be one processor socket, with other processor sockets that can be similarly configured. In addition to processor cores, various other circuitry may be included within the CPU, for example, an integrated memory controller (IMC) and uncore logic, which may be other logic of the CPU that handles various operations such as power management functions, performance monitoring and so forth.

As seen, CPU 110 may be coupled to a peripheral controller hub (PCH) 120 via a link 115. In one embodiment, link 115 may be a direct media interface (DMI) link, although the scope of the present invention is not limited in this regard. PCH 120 may provide an interface for various peripheral components of a system that can be coupled to the PCH. For example, various input/output (IO) devices, memory devices and so forth may be coupled to PCH 120. In the embodiment of FIG. 1, one such device may be a non-volatile storage, e.g., a flash memory 130 which may store a BIOS image and other system firmware. To enable communication with this memory, a serial peripheral interface (SPI) 125 may provide for control and implementation of communication with flash memory 130.

As further seen, PCH 120 may further include a storage controller 128 which may provide for control and communication with another storage device, namely a non-volatile storage 140. In one embodiment, storage controller 128 can be a small general-purpose processor core that can optionally encrypt data before it is provided to the secure partition (and decrypt such encrypted data when read from the partition). In this way, attacks where the NVRAM chips are scrapped from the baseboard and read can be prevented. In various embodiments, NV storage 140 may be an application-optimized storage such as a flash drive to enable fast save operations during execution of, e.g., user-level applications. In other words, NV storage 140 may act as a so-called solid state storage device that can be used for fast caching of information used during applications. As seen, non-volatile storage 140 includes an open region $140_a$ that can be used for this host usage during normal system operation. As will be discussed with regard to FIG. 2, however, NV storage 140 may further include a secure partition that can remain hidden from host use. That is, the secure partition may be prevented from being visible unless the system is in a secure mode of operation, e.g., SMM.

Figure 2:
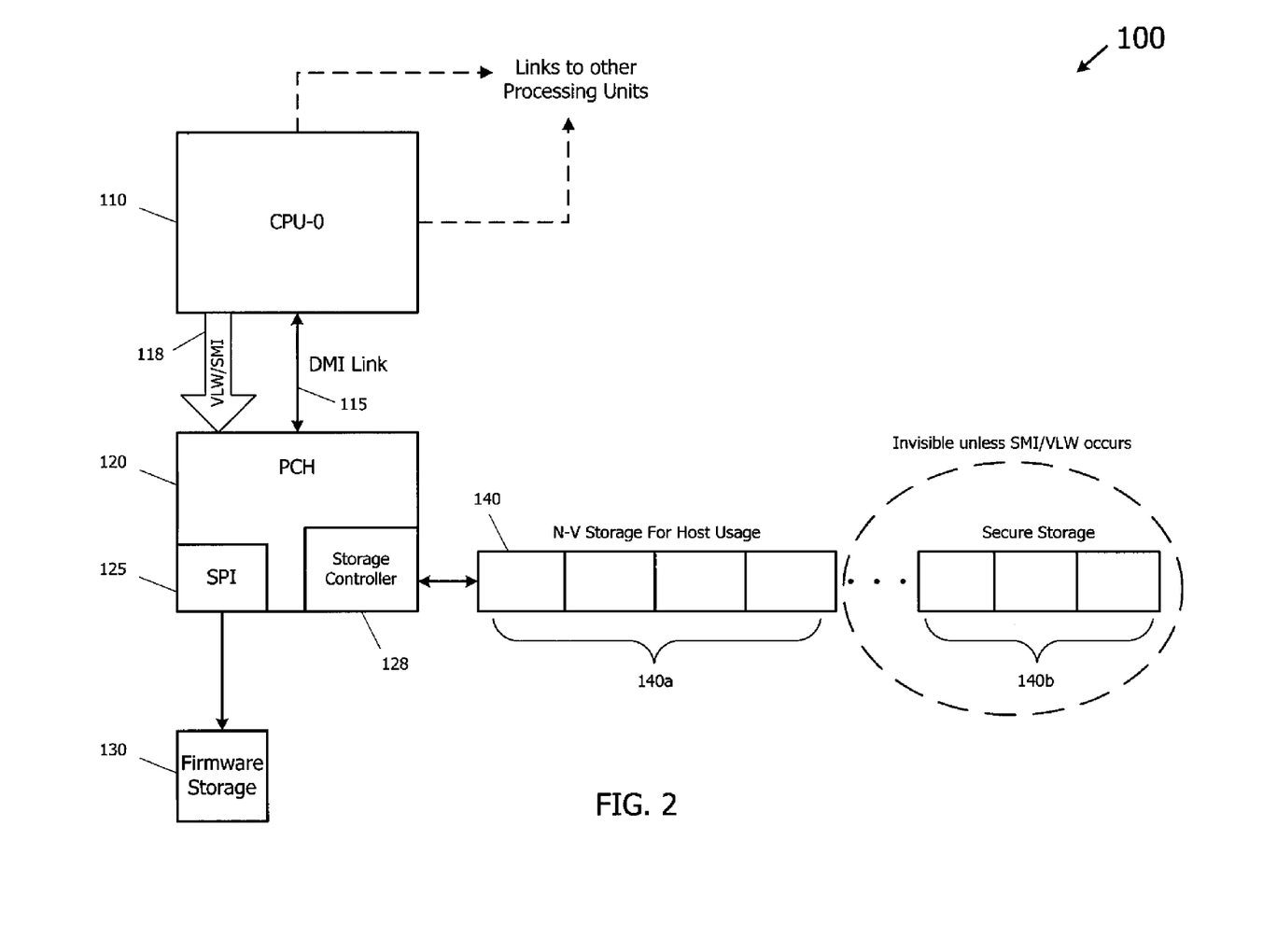
FIG. 2 is a further block diagram of the system of FIG. 1.

Referring now to FIG. 2, shown is another block diagram of the system of FIG. 1. Here, NV storage 140 is shown with its secure partition 140b visible, as the system is in a protected mode, e.g., SMM. That is, as shown in FIG. 2 when CPU 110 enters into an SMM mode, it may send a signal 118 to PCH 120. In various embodiments, the signal may be a system management interrupt (SMI) signal or a virtual legacy wire (VLW) signal. An alternative embodiment may provide a secure hidden partition that is visible only when set in a configuration register, e.g., of the storage controller which is defined as read-write (RW) in a SMM mode, allowing the register to be changed only while in SMM mode, thus providing the same security mechanism achieved via the VLW message. This VLW or the corresponding SMI signal indicates that the CPU processing cores are currently inside of an SMI. This state information is stored internally to PCH 120. Storage controller 128 may receive an indication of the internal SMM state transition and open up the secure partition(s) 140b. At the end of the SMI, the BIOS will clear an end of SMI (EOS) bit in PCH 120 to re-lock the secure partition. When this occurs, storage controller 128 hides the partition. Thus the secure partition is only visible during SMI, unless BIOS chooses to allow it to be addressed by the host outside of SMM protections, as will be described below.

Additionally, storage controller 128 may provide for locking privileges for at least some of the secure partition. This will additionally allow the host read only access to sectors as defined by the BIOS SMM handler during configuration of the secure partition, as will be discussed below. In some embodiments, these regions can span from 100's of kilobytes to megabytes for purposes of storing error logs, BIOS updates, data tables, or other matter. While the scope of the present invention is not limited in this regard, various secure information such as a BIOS image or other system firmware or software, system passwords, and other secure information can be stored in the secure partition. While shown with this high level view in the embodiments of FIGS. 1 and 2, understand that the scope of the present invention is not limited in this regard and in various embodiments, additional components can be present in the system.

Figure 3:
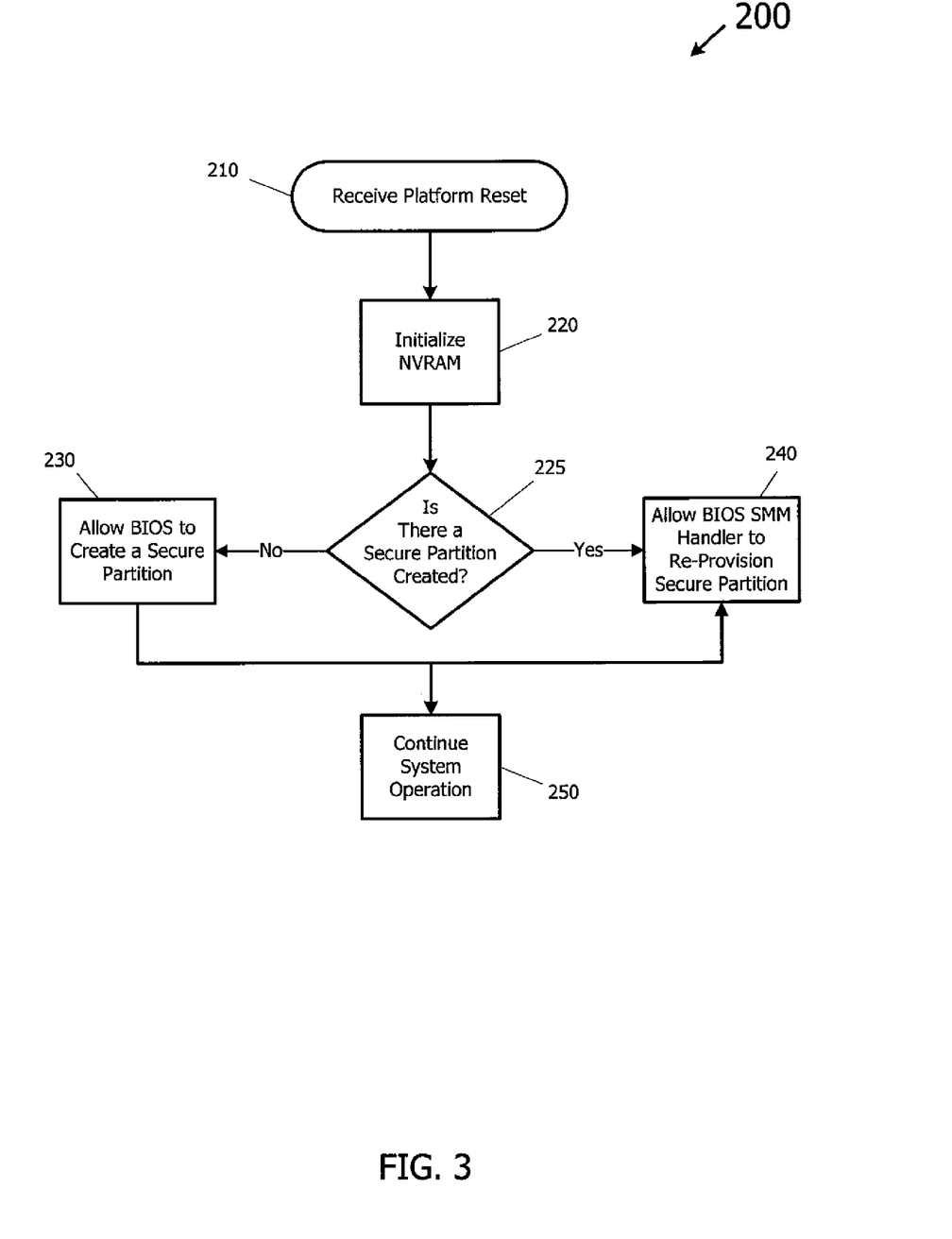
FIG. 3 is a flow diagram of an initial configuration of a portion of a fast non-volatile storage for use as a secure partition in accordance with an embodiment of the present invention.

During an initial platform power on self test (POST), BIOS can configure a portion of the NV storage 140 for secure SMM usage. Referring now to FIG. 3, shown is a flow diagram of an initial configuration of a portion of a fast non-volatile storage for use as a secure partition in accordance with an embodiment of the present invention. As shown in FIG. 3, method 200 may be implemented using a storage controller of a peripheral controller hub that in turn is coupled to the non-volatile storage. As seen, method 200 may begin by receiving a platform reset signal (block 210). Responsive to this signal, the storage controller may initialize the non-volatile storage (block 220). Note that the storage controller may typically be an embedded processing subsystem with a real-time operating system and series of computational tasks to manage the host interface for command processing and also capabilities for managing the actual storage media, such as NAND flash, that implements various capabilities to be reliable and performant, such as wear-levelings, sparing, block migration and compaction. This embedded subsystem initializes itself in response to a reset indicia prior to accepting read/write commands from the host. Next, it may be determined whether a secure partition has already been created (diamond 225). For example, an indication may be set in a control register of the storage controller to indicate whether a secure partition exists. If no such partition has been created, control passes to block 230, where BIOS may be allowed to create a secure partition. Otherwise, control passes to block 240, where in a BIOS mode, e.g., via a BIOS SMM handler, the previously-created secure partition can be re-provisioned. That is, in various embodiments, once the non-volatile secure partition is created by BIOS, only the BIOS SMM handler can re-provision the partition.

Control passes next to block 250 where system operation may continue, e.g., by concluding any pre-boot activities and passing control off to an operating system. Note that after configuration of this secure partition, it may be rendered hidden, such that it is only visible by agents operating in a secure mode of the system. Accordingly, in various embodiments access to this secure partition may only be allowed when the system is in system management mode. This may be determined, for example, by a flag of a control register of the PCH, which may be set when the system is in a system management mode. However, any other means to indicate an active SMM can be realized in other embodiments. For example, a CPU-only system management mode interrupt, such as SMM inter-processor interrupt (IPI), could be used to indicate that the host CPU is in SMM; and the CPU local advanced programmable interrupt controller (APIC) can convey this 'in-smm' indicia to the PCH.

Figure 4:
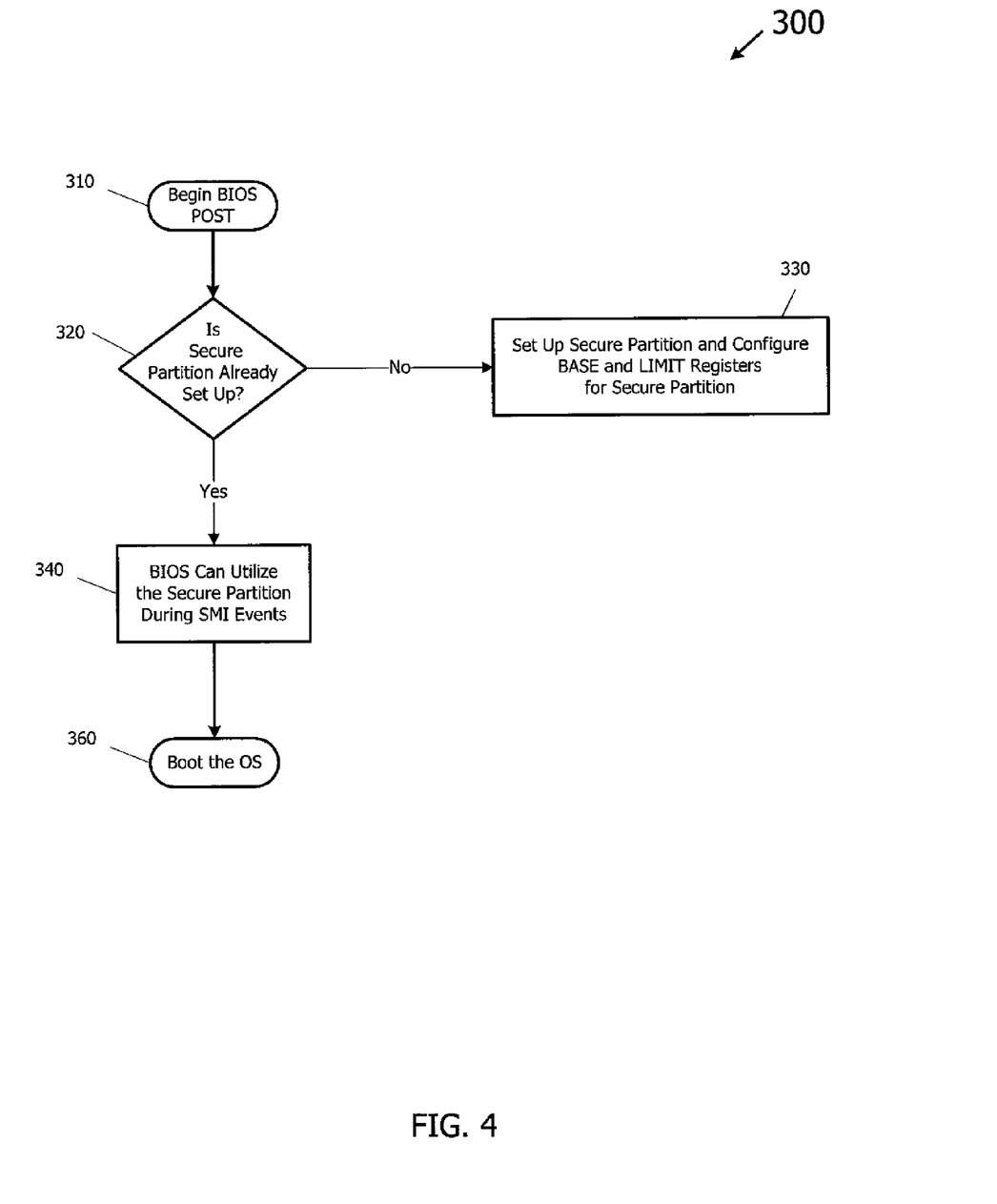
FIG. 4 is a flow diagram of a method for further operations for configuring a secure partition in accordance with an embodiment of the present invention.

Further details regarding the configuration of a secure partition, including storage of secure information into the partition can be seen with regard to FIG. 4, which is a flow diagram of a method for further operations for configuring a secure partition in accordance with an embodiment of the present invention. As shown in FIG. 4, method 300 may begin responsive to a power on self test (POST) BIOS initiation. First, it may be determined whether a secure partition has already been set up (diamond 320). If not, control passes to block 330 where the secure partition may be set up and configured. More specifically, desired information may be stored in the secure partition including information from various locations. For example, without loss of generality, the BIOS can push data into the partition from anywhere. The decision of what information to store may be up to the BIOS based on a given trust mechanism. For example, a secure service partition could be loaded from a baseboard management controller (BMC) to the BIOS via a secure inter-processor management interface (IPMI)-KCS/block transfer (BT) communication pathway. In addition, to effect the configuration of the secure partition, base and limit registers for the secure partition may be set accordingly. These registers may be located in or accessible to the storage controller in the PCH. For example, the base register may be set to a location corresponding to the beginning of the secure partition (which may be at a top of a segment of the non-volatile storage that is freely accessible to the host). In turn, a limit register may be set to a top end of the secure partition. As discussed above, during various operations, these base and limit registers may be reconfigured during a SMM operation.

Still referring to FIG. 4, control next passes to block 340 where BIOS can use the secure storage partition during SMI events. While the scope of the present invention is not limited in this regard, the SMM core can use this storage to store additional SMM drivers/handlers/capabilities; for a Unified Extensible Firmware Interface (UEFI) (UEFI) pre-initialization (PI) SMM driver execution (DXE) design, where each SMM handler is a Portable Executable and Common Object File Format (PE/COFF) executable image that can be 'loaded' from this storage. Also, a SMM driver can use this region to store error logs; these can include PCI and memory single bit errors (SBE's) and multi-bit errors (MBE's). This region can also store full system BIOS updates, such as UEFI PI firmware volumes; for a high-availability server, the number of resets is limited, so a series of BIOS updates can be posted to the SMM driver from the host and queued up/stored in the SMM secure storage for application across the next reset. The region can also contain chipset settings that are stored by the BIOS on an Advanced Configuration and Power Interface (ACPI) system state S5 and that are re-played or re-programmed on an S3 restart or a successive S4/S5 when the platform configuration 'has not changed'. The region may also be used to store SMBIOS and ACPI tables so that during the 'gap' when untrusted third party drivers/loaders run, the tables can be protected; and/or when a trusted environment commences, such as that initiated by an Intel™ Trusted Execution Technology (TXT) SENTER event, the tables can be copied into memory for the trusted environment by the BIOS SMM. Note that optionally, the BIOS can leave the secure partition open to the host on an SMI-to-SMI basis. That is, in some use models, the secure partition may be left open at the conclusion of one SMM mode. However, in such implementations a periodic SMM mode may be implemented such that on the following SMM, the secure partition can be locked to prevent free access to it by untrusted agents. Referring still to FIG. 4, finally control passes to block 360, where the OS may be booted.

Figure 5:
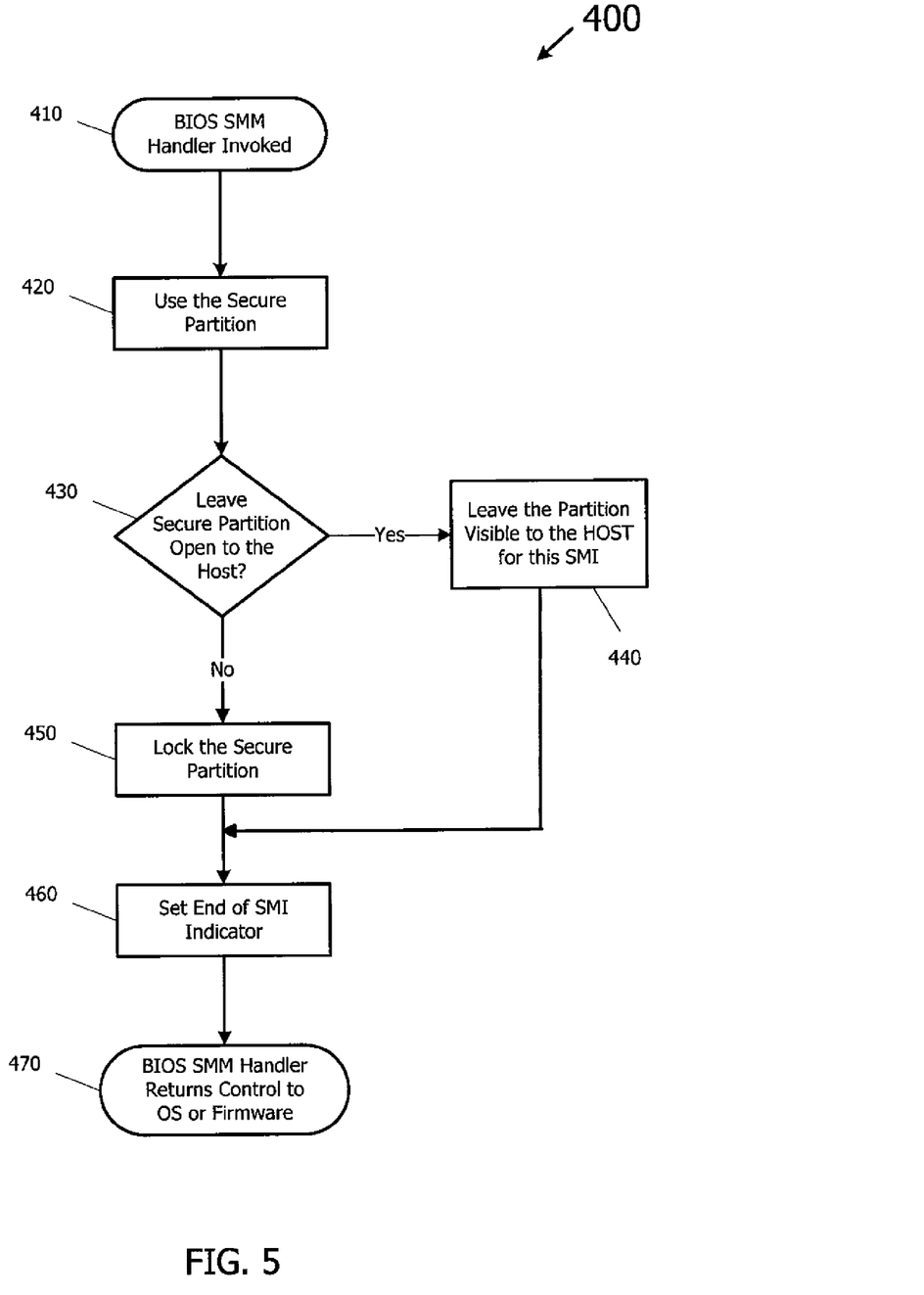
FIG. 5 is a flow diagram of a method for using a secure partition in accordance with an embodiment of the present invention.

After such configuration operations, on subsequent SMI signals the BIOS SMM handler will be invoked and all cores may enter a SMM rendezvous. Referring now to FIG. 5, shown is a flow diagram of a method for using a secure partition in accordance with an embodiment of the present invention. As shown in FIG. 5, method 400 may begin when an SMM handler is invoked (block 410). Control then passes to block 420, where the BIOS handler may use the secure partition. For example, to implement various operations at high speeds, this fast memory can be accessed to run a portion of the BIOS image or to access secure information such as passwords or so forth.

After such usage of the secure partition, control passes to diamond 430 where it may be determined whether the secure partition can be left open to the host. If so, the partition may remain visible to the host, as seen at block 440. Otherwise, control passes to block 450, where the secure partition may be locked. For example, a flag present in a control register of the storage controller associated with the non-volatile storage may be set to indicate that the secure partition is locked. Accordingly, this portion of the non-volatile storage is thus invisible to host access or even view.

From both of blocks 440 and 450, control passes to block 460, where an end of SMI (EOS) indicator may be set and accordingly, control passes to block 470, where the BIOS SMM handler may return control to the OS. In other embodiments, instead of returning to OS control, control may be returned to other system software such as other firmware of the system. While shown with this particular implementation in the embodiment of FIG. 5, understand the scope of the present invention is not limited in this regard.

Figure 6:
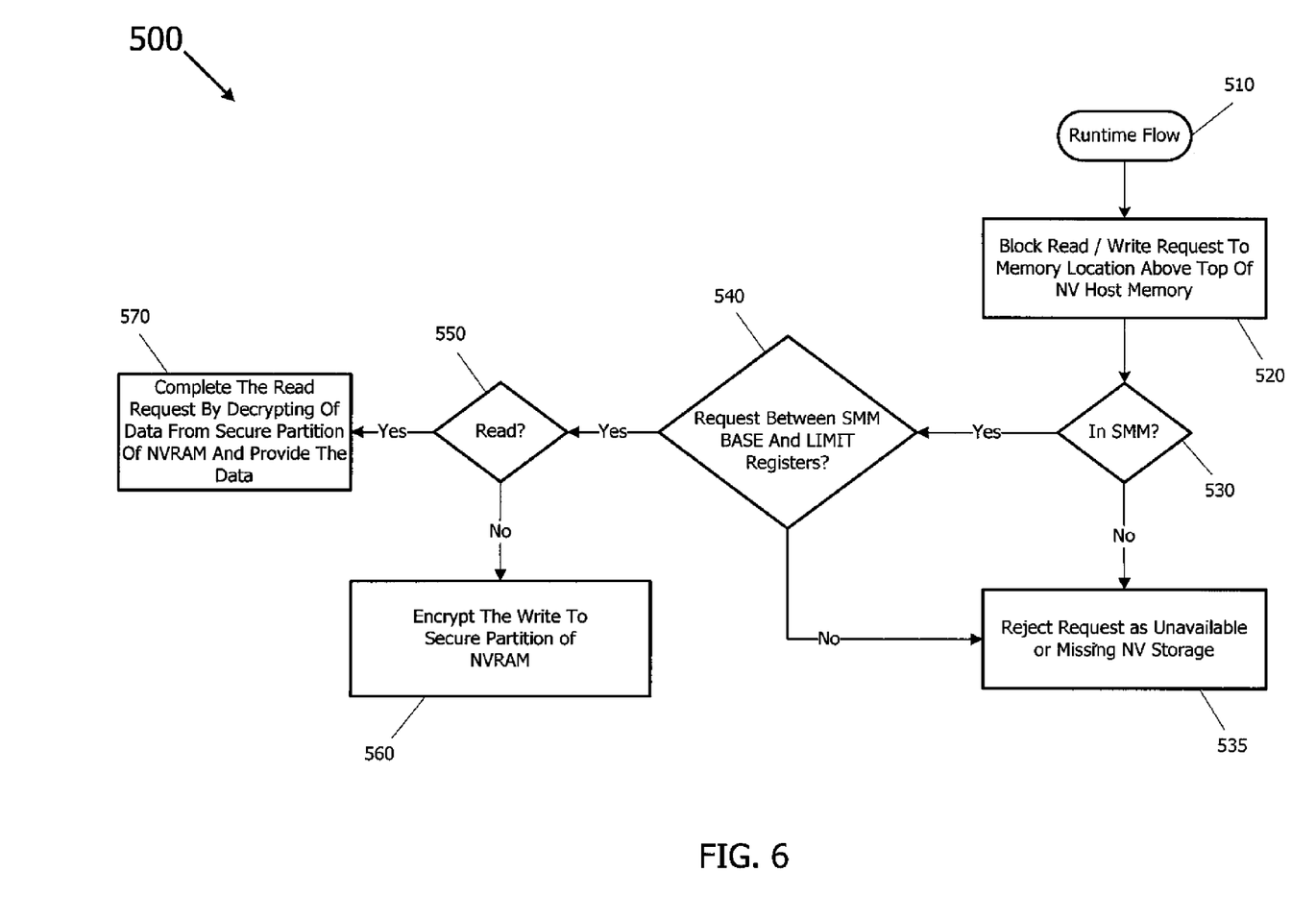
FIG. 6 is a flow diagram of a method for handling access requests to a secure partition in accordance with an embodiment of the present invention.

As discussed above, this secure partition may be protected from access or even viewing during a host mode of operation. Referring now to FIG. 6, shown is a flow diagram of a method for handling access requests to a secure partition in accordance with an embodiment of the present invention. As shown in FIG. 6, method 500 may begin during execution of a runtime flow. During this flow, a block read/write request may be received for a location in the fast non-volatile storage that is above the top of non-volatile host memory (block 520). Next, it may be determined whether the system is in a secure mode, e.g., an SMM mode (diamond 530). As discussed above, this determination may be made with reference to an SMM flag present in the PCH. If the system is not in a secure mode, control passes to block 535 where the request may be rejected as unavailable or as directed to a missing storage location.

If instead it is determined that the system is in a secure mode, control passes from diamond 530 to diamond 540, where it may be determined whether the request falls within the secure partition range, as determined with reference to the base and limit registers. If not, control passes again to block 535 discussed above. Otherwise, if a valid request is within the secure partition, control passes to diamond 550. There it may be determined whether the request is a read request. If so, the read request may be completed by accessing the data from the location in a secure partition and decrypting the data, if the data was encrypted while in the secure partition. That is, in various implementations to provide for further protection of information stored in the secure partition, encryption of the information may occur.

Otherwise, if the request is a write request, control passes to block 560 where the data may be stored in the secure partition. Again, if the implementation provides for encryption, the storage controller may encrypt the data prior to its storage in the secure partition. While shown with this particular implementation in the embodiment of FIG. 6, understand the scope of the present invention is not limited in this regard.

Figure 7:
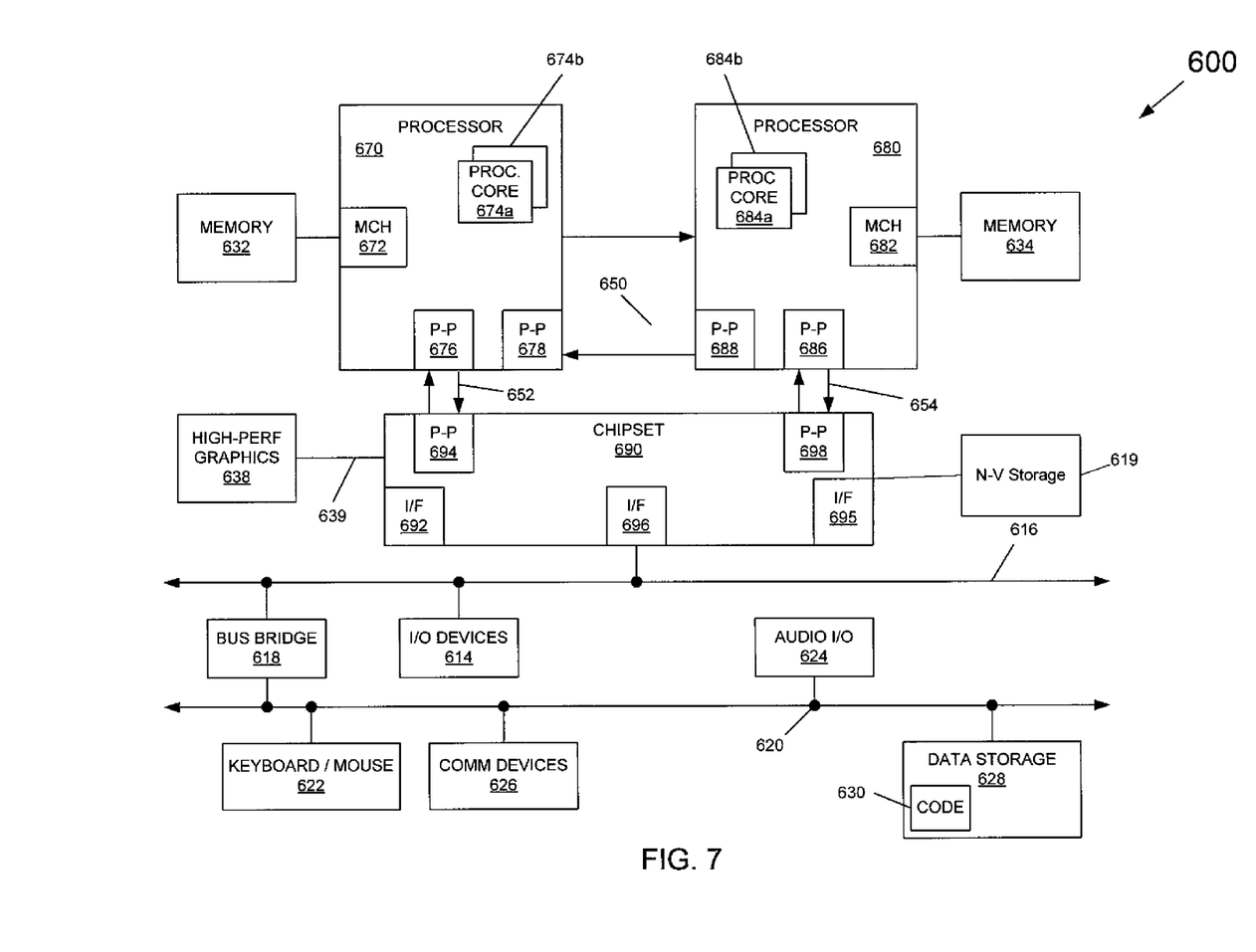
FIG. 7 is a block diagram of a system in accordance with one embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674a and 674b and processor cores 684a and 684b), although potentially many more cores may be present in the processors.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In addition chipset 690 may include an interface 695, which may be a storage controller to interface with a storage 619, which may be a fast non-volatile storage that can include one or more secure or hidden partitions in accordance with an embodiment of the present invention. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620.

Figure 8:
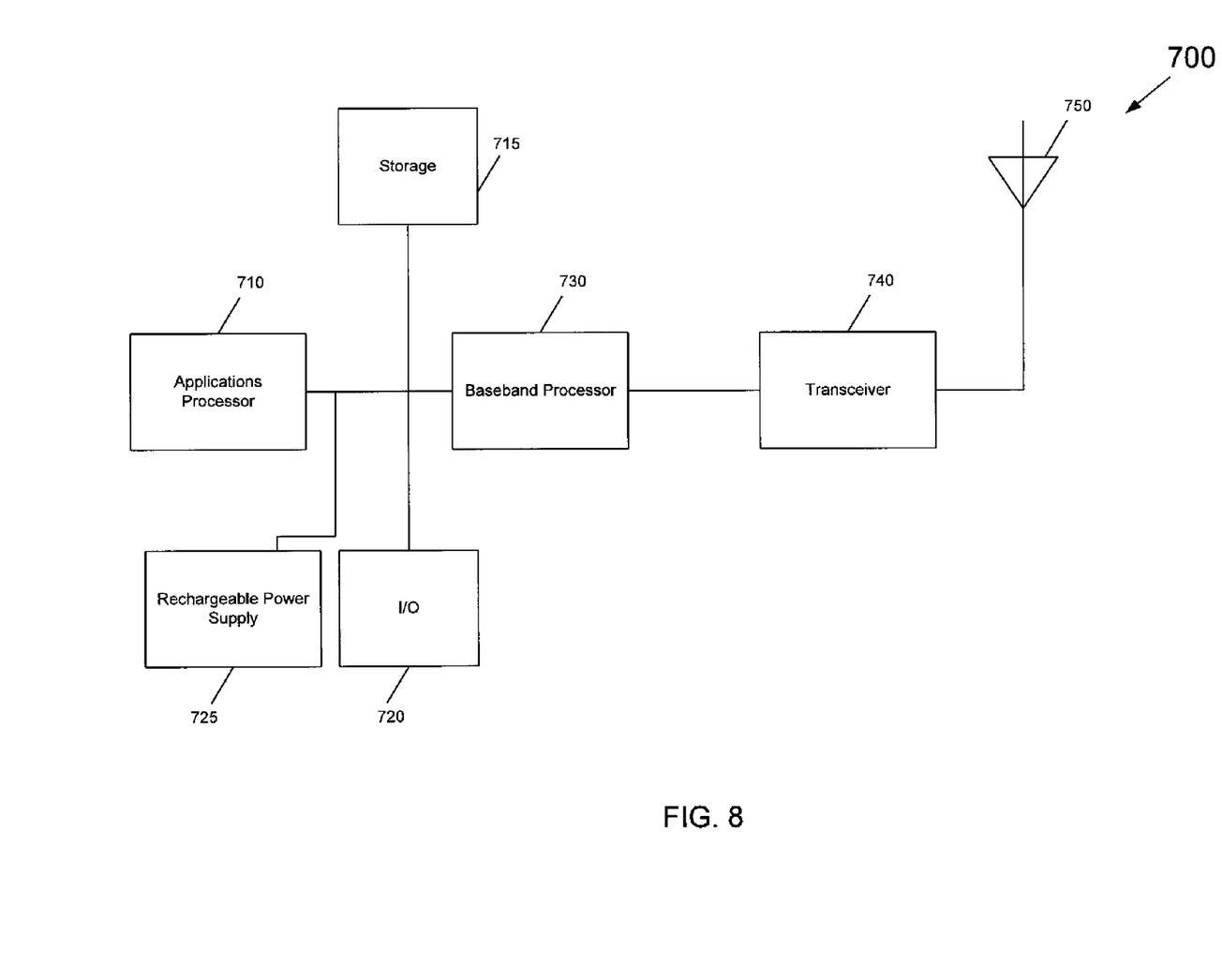
FIG. 8 is a block diagram of a system in accordance with another embodiment of the present invention.

As discussed above, embodiments can be incorporated into other types of systems including mobile devices such as a cellular telephone. Referring now to FIG. 8, shown is a block diagram of a system in accordance with another embodiment of the present invention. As shown in FIG. 8, system 700 may be a mobile device and may include various components. As shown in the high level view of FIG. 8, an applications processor 710, which may be a central processing unit of the device, is in communication with various components including a storage 715. Storage 715, in various embodiments, may include both program and data storage portions and can provide for secure storage in a secure partition in accordance with an embodiment of the present invention. Applications processor 710 may further be coupled to an input/output system 720, which in various embodiments may include a display and one or more input devices such as a touch keypad, which itself can appear on the display when executed.

Applications processor 710 also may couple to a baseband processor 730 which conditions signals such as voice and data communications for output, as well as to condition incoming telephone and other signals. As seen, baseband processor 730 couples to a transceiver 740 which may enable both receive and transmit capabilities. In turn, transceiver 740 may be in communication with an antenna 750 that can be any type of antenna capable of transmitting and receiving voice and data signals via one or more communication protocols such as via a wireless wide area network (e.g., a 3G or 4G network) and/or a wireless local area network (such as a BLUETOOTH™ or so-called WI-FI™ network in accordance with an Institute of Electrical and Electronics Engineers 802.11 standard). As seen, system 700 may further include a rechargeable power supply 725 having a rechargeable battery to enable operation in a mobile environment. While shown with this particular implementation in the embodiment of FIG. 8, the scope of the present invention is not limited in this regard.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Note that since the storage controller may be implemented in a PCH along with a serial advanced technology attachment (SATA) controller, embodiments can be used with other emergent technologies, such as an encrypting hard drive interface to persist at least some of the information in an encrypted manner to a mass storage, e.g., a disk drive.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a processor to execute instructions; and
    a peripheral controller coupled to the processor via a first link, the peripheral controller including a storage controller to control a non-volatile storage coupled to the peripheral controller, wherein the storage controller is to:
        in a first mode, enable access to a secure partition of the non-volatile storage in a secure mode and prevent visibility of the secure partition outside of the secure mode; and
        in a second mode, prevent access to the secure partition prior to a first instance of the secure mode, enable access to the secure partition in the first instance of the secure mode, and after conclusion of the first instance of the secure mode, continue to enable access to the secure partition.

2. The apparatus of claim 1, wherein the peripheral controller further includes a flash interface to interface with a flash memory that stores a basic input/output system (BIOS).

3. The apparatus of claim 2, wherein at least a portion of the BIOS is to be stored in the secure partition during system operation.

4. The apparatus of claim 1, wherein the processor is to send a system management interrupt (SMI) signal to the peripheral controller to indicate entry into the secure mode and the storage controller is to open the secure partition responsive to the SMI signal.

5. The apparatus of claim 1, wherein the storage controller is to encrypt data prior to storage in the secure partition.

6. The apparatus of claim 1, wherein the non-volatile storage includes an open partition that is to provide fast cache access to application information for an application executed in a non-secure mode.

7. The apparatus of claim 2, wherein the BIOS is to create the secure partition and to set a region for the secure partition in a plurality of boundary registers of the storage controller and to lock the secure partition after the creation.

8. The apparatus of claim 7, wherein the BIOS is to enable read access to a portion of the secure partition in a non-secure mode and to prevent write access to the portion in the non-secure mode.

9. A method comprising:
    configuring, using trusted code of a trusted mode of a system, a secure partition of a non-volatile storage of the system, the non-volatile storage separate from a firmware storage of the system;
    in a first mode:
        responsive to a first interrupt signal that indicates entry into a first instance of the trusted mode, enabling access to the secure partition;
        accessing the secure partition during the trusted mode and performing at least one operation using information stored in the secure partition; and
        locking the secure partition during a first untrusted mode subsequent to the first instance of the trusted mode; and
    in a second mode:
        responsive to a second interrupt signal that indicates entry into a second instance of the trusted mode, enabling access to the secure partition; and
        allowing the secure partition to remain visible during a second untrusted mode subsequent to the second instance of the trusted mode.

10. The method of claim 9, further comprising in the first mode, maintaining the secure partition hidden in the untrusted mode via a configuration register of a storage controller coupled to the non-volatile storage.

11. The method of claim 9, further comprising in the first mode, allowing untrusted code to access an open partition of the non-volatile storage via a storage controller of a peripheral controller coupled to a processor, and preventing the untrusted code from access to the secure partition of the non-volatile storage via the storage controller.

12. The method of claim 11, further comprising accessing firmware in the firmware storage coupled to the peripheral controller and storing at least a portion of the firmware in the secure partition to enable faster access to the firmware than from the firmware storage.

13. An article comprising a non-transitory machine-accessible storage medium including instructions that when executed cause a system to:
receive a memory access request to a location in a non-volatile storage coupled to a peripheral controller, the non-volatile storage including a first portion to be accessible to application code and a second portion that is inaccessible and hidden to the application code;
in a first mode:
determine if the system is in a trusted mode and if so, enable access to the second portion to perform the memory access request; and
otherwise, to prevent access to the second portion; and
in a second mode:
enable access to the second portion in a first instance of the trusted mode;
after conclusion of the first instance of the trusted mode, continue to enable access to the second portion.

14. The article of claim 13, further comprising instructions that enable the system to indicate to a requester of the memory access request that in the first mode the non-volatile storage is unavailable if the system is not in the trusted mode.

15. The article of claim 13, further comprising instructions that enable the system to encrypt data and to store the data of the memory access request in the second portion if the memory access request is a write request and if the system is in the trusted mode.

16. The article of claim 15, further comprising instructions that enable the system to decrypt data obtained from the second portion responsive to the memory access request if the memory access request is a read request.

17. The article of claim 13, wherein preventing access to the second portion includes sending a message to a requester of the memory access request to indicate that the memory access request is for a missing storage location.

18. The apparatus of claim 1, wherein in the second mode, after the end of a second instance of the secure mode subsequent to the first instance of the secure mode, the storage controller is to lock the secure portion.

19. The method of claim 9, further comprising in the second mode, after a conclusion of entry into a third instance of the trusted mode, locking the secure portion.

20. The article of claim 13, wherein the storage medium further includes instructions that when executed cause the system to:
in a second instance of the system in the trusted mode after the first instance of the system in the trusted mode, enable access to the second portion; and
after conclusion of the second instance of the system in the trusted mode, prevent access to the secure partition.

* * * * *